US012661932B2

(12) United States Patent
Sauve et al.

(10) Patent No.: US 12,661,932 B2
(45) Date of Patent: Jun. 23, 2026

(54) TIRE FOR A HEAVY DUTY VEHICLE WITH IMPROVED GRIP

(71) Applicant: COMPAGNIE GENERALE DES ETABLISSEMENTS MICHELIN, Clermont-Ferrand (FR)

(72) Inventors: David Sauve, Clermont-Ferrand (FR); Benoit Buffetaud, Clermont-Ferrand (FR); Arnaud Larregain, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/874,788

(22) PCT Filed: Jun. 13, 2023

(86) PCT No.: PCT/EP2023/065728
§ 371 (c)(1),
(2) Date: Dec. 13, 2024

(87) PCT Pub. No.: WO2023/242158
PCT Pub. Date: Dec. 21, 2023

(65) Prior Publication Data
US 2025/0360757 A1    Nov. 27, 2025

(30) Foreign Application Priority Data
Jun. 15, 2022    (FR) ...................................... 2205803

(51) Int. Cl.
*B60C 11/12*    (2006.01)
*B60C 11/03*    (2006.01)
*B60C 11/13*    (2006.01)

(52) U.S. Cl.
CPC ...... *B60C 11/0323* (2013.01); *B60C 11/1204* (2013.01); *B60C 11/1236* (2013.01); *B60C 2011/0383* (2013.01); *B60C 2200/06* (2013.01)

(58) Field of Classification Search
CPC ......... B60C 11/0323; B60C 2011/0381; B60C 2011/0383; B60C 2011/1231
See application file for complete search history.

(56) References Cited

U.S. PATENT DOCUMENTS

2005/0150582 A1*    7/2005    Matsumura ........ B29D 30/0606
425/35
2011/0277898 A1*    11/2011    Barraud ................ B60C 11/032
152/209.18
(Continued)

FOREIGN PATENT DOCUMENTS

WO        2011039194 A1    4/2011
WO        2011101495 A1    8/2011
(Continued)

*Primary Examiner* — Robert C Dye
(74) *Attorney, Agent, or Firm* — COZEN O'CONNOR

(57)        ABSTRACT

A tire (1) for a trailer of a heavy-duty vehicle having a tread (2), which has at least one complex circumferential cut (7) in a median portion (4) having a first family of transverse cuts, referred to as transverse through-sipes (81), having a thickness (E1) at most equal to 0.8 mm, a depth (P1) at least equal to 20% of the maximum depth-of-cut (H), and being at a distance (D1), from the nearest external cavity (71), at least equal to 7 mm, and/or a second family of transverse cuts, referred to as blind transverse cuts (82), that stop near an external cavity (71), that have a thickness (E2) at least equal to 1 mm, a depth (P2) at most equal to 20% of the maximum depth-of-cut (H), and being at a distance (D2), from said external cavity (71), at least equal to 3 mm.

11 Claims, 2 Drawing Sheets

(56)  References Cited

U.S. PATENT DOCUMENTS

| | | | |
|---|---|---|---|
| 2020/0298625 A1 | 9/2020 | Zhu | |
| 2021/0178829 A1 | 6/2021 | Zivkovic | |
| 2021/0229502 A1* | 7/2021 | Berthier | B60C 11/042 |
| 2021/0347209 A1 | 11/2021 | Djabour | |
| 2022/0048335 A1 | 2/2022 | Mayni | |

FOREIGN PATENT DOCUMENTS

| | | | |
|---|---|---|---|
| WO | 2012130735 A1 | 10/2012 |
| WO | 2016188956 A1 | 12/2016 |
| WO | 2017174925 A1 | 10/2017 |
| WO | 2019008276 A1 | 1/2019 |
| WO | 2019122677 A1 | 6/2019 |

* cited by examiner

TIRE FOR A HEAVY DUTY VEHICLE WITH IMPROVED GRIP

RELATED APPLICATIONS

This is a U.S. National Phase Application under 35 USC 371 of International Application PCT/EP2023/065728 filed on Jun. 13, 2023.

This application claims the priority of French application no. FR 2205803 filed Jun. 15, 2022, the entire content of all of which is hereby incorporated by reference.

FIELD OF THE INVENTION

The invention relates to a tire for a heavy-duty vehicle and more particularly for a trailer of a heavy-duty vehicle, and relates to the tire tread, which more particularly comprises complex and evolving cuts, the shape of which evolves as the tread gradually wears.

BACKGROUND OF THE INVENTION

A tread, consisting of at least one rubbery material, is the peripheral part of the tire, intended to be worn when it comes into contact with the ground via a tread surface and to grip the ground. It generally comprises a tread pattern, consisting of cuts separating raised elements and therefore delimited by two walls of rubbery material.

By definition, the circumferential or longitudinal direction is the direction of rotation of the tire, the axial or transverse direction is the direction parallel to the axis of rotation of the tire and the radial direction is a direction perpendicular to the axis of rotation of the tire.

Any cut in the tread, having a mean line that is not necessarily rectilinear, that is to say one that may be undulating or zigzag, is circumferential or transverse. By definition, the mean line of a cut is the intersection between its mean surface, equidistant from the walls delimiting the cut, and the tread surface. By convention, a cut is said to be circumferential when its mean line has a substantially circumferential mean direction, that is to say one forming, with the circumferential direction, a mean angle of less than 45°. A cut is said to be transverse when its mean line has a substantially transverse mean direction, that is to say one forming, with the circumferential direction, a mean angle at least equal to 45°.

As is known, the wet-weather running conditions of a vehicle, and more particularly those of a heavy-duty vehicle, require rapid evacuation of the water present in the contact patch in which the tread is in contact with the road surface. This evacuation makes it possible to ensure that the material constituting the tread comes into direct contact with the road surface via the tread surface. The water that is not pushed ahead of or to the sides of the tire flows or is collected partially in the cuts formed in the tread. The evacuation of the water is ensured by the cuts, which form a fluid flow network that needs to be effective throughout the service life of the tire, from new to its state of maximum wear. The state of maximum wear, which is set by the regulations in force, is the state of wear beyond which the tire needs to be removed from the vehicle for safety reasons.

The cuts allowing the evacuation of water are usually essentially wide cuts called grooves. A groove has a width such that the facing walls of material that delimit the groove do not come into contact with one another when the tread enters the contact patch, when the tire is subjected to recommended inflation and load conditions as are defined in particular by the European standards of the "European Tire and Rim Technical Organization" or "E.T.R.T.O." in its "Standards Manual 2021—Commercial Vehicle Tires". The deformations in compression and in shear of the raised elements delimiting the groove govern the pressures in the contact patch, and therefore the wear. In addition, these deformations, by generating hysteresis losses in the material of the tread, impact the rolling resistance, and therefore the fuel consumption of the vehicle.

A tread may also comprise narrow cuts or sipes. A sipe has a width such that the facing walls of material that delimit the sipe come into contact with one another at least partially when the tread enters the contact patch, under the tire load and pressure conditions specified by the E.T.R.T.O as defined above. A sipe is not able to evacuate the water, but, with respect to the grip, has an edge corner effect in the contact patch, which makes it possible in particular to break a film of water that may be present on the ground.

The counterpart to the presence of cuts in a tread is that they reduce the volume of material that can be worn away. In order to limit the reduction in the volume of tread material that can be worn away resulting from the presence of grooves and sipes, so-called complex cuts have been proposed which make it possible, with respect to conventional grooves, which open entirely onto the tread surface, to increase the volume of tread material while respecting the volume of cuts for water storage beyond a predetermined threshold, whatever the level of wear of the tire.

Treads comprising such complex cuts have been described in particular in documents WO2011039194A1, WO2011101495A1, WO2012130735A1, WO2016188956A1, WO2017174925A1, WO2019008276A1 and WO2019122677A1. A complex cut opens onto the tread surface in a generally discontinuous manner, at regular or irregular intervals, when new. A complex cut thus has external cavities, which open onto the tread surface and are separated from one another in the main direction of the complex cut. The main direction of the complex cut is often although not necessarily the direction in which water flows in said complex cut when running on ground covered in water. In addition to the external cavities, this complex cut comprises internal cavities formed inside the tread which do not open directly onto the tread surface when new and which are generally connected to the tread surface by sipes. These internal cavities are positioned radially and entirely on the inside of the tread surface in the new state, and are interposed between the external cavities. The internal cavities may be positioned at different depth levels within the thickness of the tread. Furthermore, the external cavities and the internal cavities of the one same complex cut are interconnected in such a way that the continuity of the flow of water in each complex cut is ensured in any state of wear of the tread, as in the case of a conventional continuous groove. On the other hand, the juxtaposition of internal and external cavities that are not connected to one another, and therefore do not allow fluid to flow from one to the other, does not constitute a continuous groove and is therefore not considered to be a complex cut.

The volume of all the internal cavities and external cavities present in a tread with complex cuts is generally less than that of all the grooves present in a conventional tread that open entirely onto the tread surface when new and have a depth corresponding to the maximum depth of the internal or external cavities, which means that, for a complex cut, there is a greater volume of material that can be worn away. Such a tread comprising complex cuts is also more rigid than an equivalent tread comprising conventional open grooves.

A tread may comprise both complex cuts, opening onto the tread surface intermittently, and conventional grooves, opening onto the tread surface over their entire length.

Consider the specific case of a tire for a trailer of a heavy-duty vehicle: its tread usually, although not necessarily, comprises between four and seven circumferential rows of raised elements. For this type of tread, complex circumferential cuts such as those described hereinabove have been envisioned, particularly between two circumferential rows of raised elements that are consecutive, but not positioned at the edge of the tread. In other words, these complex circumferential cuts are preferably positioned in a median portion of the tread.

It is known that a tire for a trailer of a heavy-duty vehicle is subjected to severe transverse loadings when the vehicle corners sharply, particularly at roundabouts. Under such conditions of running in a curved line, the tire is subjected to sideslip forces which severely load the tread, particularly at its edges. This is why such a tread comprises robust circumferential edge rows, often consisting of a continuous rib without any cuts.

It is also known that a tire for a trailer of a heavy-duty vehicle needs to have high grip performance, particularly under harsh running conditions, such as when running on snowy ground. One known solution is to provide the tread with transverse sipes the orientation of which is optimized with respect to the desired grip direction. Typically, a transverse sipe, forming, by convention, with the circumferential direction of the tire a mean angle at least equal to 45°, has a transverse component that is effective with respect to longitudinal grip and a longitudinal component that is effective with respect to transverse grip. The effectiveness of such a transverse sipe, with respect to grip, is based on an indentation effect achieved by the outer edge corners of the sipe forming indentations in the ground. These transverse sipes are located in a median portion of the tread and are generally excluded from the edge rows that are very highly mechanically loaded, as described hereinabove.

SUMMARY OF THE INVENTION

The inventors have therefore set themselves the objective, for a tire for a trailer of a heavy-duty vehicle, having a tread comprising evolving complex cuts, of improving its grip performance, particularly on snowy ground, without impairing its mechanical strength with regard to sideslip loadings.

This objective has been achieved by means of a tire for a heavy-duty vehicle comprising a tread, intended to come into contact with the ground via a tread surface, comprising a median portion and two lateral portions,

- the median portion being separated from each lateral portion by a circumferential cut forming, with a circumferential direction of the tire, a mean angle less than 45°,
- the median portion comprising at least one complex circumferential cut, forming, with the circumferential direction of the tire, a mean angle less than 45°,
- the at least one complex circumferential cut comprising, when the tire is new, an alternation of external cavities, opening onto the tread surface, and of internal cavities, that are hidden inside the tread and connected to the tread surface by a circumferential sipe, two consecutive cavities, respectively an external cavity and an internal cavity being connected to one another,

- the median portion comprising a plurality of transverse cuts, having at least one transverse portion forming, with the circumferential direction of the tire, a mean angle at least equal to 45°,
- the tread having a maximum depth-of-cut,
- the plurality of transverse cuts comprising a first family of transverse cuts, referred to as transverse through-sipes, that intersect at least one complex circumferential cut between two consecutive external cavities and that each have a thickness at most equal to 0.8 mm and a depth at least equal to 20% of the maximum depth-of-cut, each transverse through-sipe being at a distance, from the nearest external cavity of said complex circumferential cut, at least equal to 7 mm,
- and/or the plurality of transverse cuts comprising a second family of transverse cuts, referred to as blind transverse cuts, that stop near an external cavity of a complex circumferential cut, and that each have a thickness at least equal to 1 mm and a depth at most equal to 20% of the maximum depth-of-cut, each blind transverse cut being at a distance, from said external cavity, at least equal to 3 mm.

The tread of a tire according to the invention therefore essentially comprises a median portion with at least one complex circumferential cut having a surface opening onto the tread surface that is of a shape that evolves as the tire gradually wears, said median portion comprising, when the tire is new, one or the other or both of the two families of transverse cuts described hereinafter.

The first family of transverse cuts covers transverse through-sipes, which is to say sipes that pass through said complex circumferential cut outside of the external cavities of the complex circumferential cut. An external cavity, when the tire is new, has a section opening onto the tread surface, of significant size, typically with a smallest dimension at least equal to 7 mm. The intermediate portion connecting two consecutive external cavities usually comprises a narrow cut, referred to as a circumferential sipe, having a thickness generally at most equal to 1 mm, and extending an internal cavity radially outwards. As a result, a transverse through-sipe intersects a circumferential sipe, extending an internal cavity radially outwards and circumferentially connecting two consecutive external cavities.

A transverse through-sipe has a thickness at most equal to 0.8 mm and a depth at least equal to 20% of the maximum depth-of-cut. It is therefore a transverse sipe that is present on the tread surface down to at least 20% tread wear. According to the invention, this transverse through-sipe intersects the complex circumferential cut, and more specifically the circumferential sipe connecting two consecutive external cavities to one another, at a distance, from the nearest external cavity, at least equal to 7 mm.

This minimum distance of 7 mm limits the risk of cracks beginning and spreading between the transverse through-sipe and the nearest external cavity, during so-called sideslip transverse loadings of the tread of the tire and correspondingly limits the risk of chunking damage to the tread.

The second family of transverse cuts relates to the blind transverse cuts which stop near an external cavity. By comparison with a transverse through-sipe of the first family, a blind transverse cut has a much higher thickness, at least equal to 1 mm, and a smaller depth, at most equal to 20% of the maximum depth-of-cut. Furthermore, the minimum distance with respect to the nearest external cavity, which is equal to 3 mm for a blind transverse cut, is smaller than that for a transverse through-sipe.

Just as was the case with a transverse through-sipe, this minimum distance of 3 mm limits the risk of cracks beginning and spreading between the transverse through-sipe and the nearest external cavity, during so-called sideslip transverse loadings of the tread of the tire, and so limits the risk of chunking damage to the tread. It may be noted that a blind transverse cut, which is thicker than but not as deep as a transverse through-sipe, may be closer to an external cavity because the risk of cracking that it may generate is lower.

Advantageously, with the plurality of transverse cuts comprising a first family of transverse through-sipes, each transverse through-sipe has a thickness at least equal to 0.4 mm. This minimum sipe thickness is essentially the result of a technological constraint regarding the manufacture of the metal sipe blades used for moulding said sipes.

More advantageously still, with the plurality of transverse cuts comprising a first family of transverse through-sipes, each transverse through-sipe has a depth at most equal to the maximum depth-of-cut. The deeper the sipe, the longer the period of time for which its edge-corner effect on grip is maintained as the tire wears, providing lasting grip over the course of the life of the tire. However, a deeper sipe contributes to local flexibility of the tread pattern of the tread, which may reduce the wearing life as well as potentially weakening said tread pattern with regard to chunking.

As a preference, with the plurality of transverse cuts comprising a first family of transverse through-sipes, the distance between each transverse through-sipe and the nearest external cavity is at least equal to 10 mm. The greater the minimum distance between the transverse through-sipe and the nearest external cavity, the lower the risk of cracking, because of the greater distance that a crack has to spread.

Advantageously, with the plurality of transverse cuts comprising a second family of blind transverse cuts, each blind transverse cut has a thickness at least equal to 2 mm. A higher minimum thickness makes it possible to reduce the risk of cracks starting at the end of the blind transverse cut, near the external cavity.

More advantageously still, with the plurality of transverse cuts comprising a second family of blind transverse cuts, each blind transverse cut has a thickness at most equal to 5 mm, preferably at most equal to 4 mm. The greater the thickness of the blind transverse cut, the greater the road noise generated, hence the benefit of limiting this thickness.

Advantageously also, with the plurality of transverse cuts comprising a second family of blind transverse cuts, each blind transverse cut has a depth at least equal to 10% of the maximum depth-of-cut. A blind transverse cut needs to have sufficient depth, when the tire is new, to have a significant edge-corner effect on grip.

According to one particular embodiment, with the plurality of transverse cuts comprising a second family of blind transverse cuts, at least one blind transverse cut comprises a first transverse portion, forming, with the circumferential direction of the tire, a mean angle at least equal to 45°, and a blind end portion forming, with the circumferential direction of the tire, a mean angle less than 45°, preferably less than 30°, and more preferably still, less than 25°. The blind end portion is therefore circumferential, within the meaning of the abovedefined convention. In this particular embodiment, the blind transverse cut comprises a first transverse portion, forming, with the transverse direction, a mean angle at least equal to 45° with respect to the circumferential direction. This first transverse portion is extended by a second circumferential blind end portion, forming, with respect to the circumferential direction, a mean angle less than 45°. The blind transverse cut therefore has a broken mean line, at two different angles, the mean angle of the blind end portion being one design parameter that allows adjustment of the minimum distance between the blind end and the nearest external cavity.

Advantageously, the circumferential pitch spacing between two consecutive transverse cuts of the plurality of transverse cuts is at least equal to 10 mm, preferably at least equal to 20 mm. The circumferential pitch spacing is the maximum circumferential distance measured between two consecutive transverse cuts, not necessarily from the same family. Below 10 mm, the circumferential pitch spacing becomes too small and the high number of transverse cuts increases, in particular, the road noise and the risk of chunking of the tread.

Advantageously also, the circumferential pitch spacing between two consecutive transverse cuts of the plurality of transverse cuts is at most equal to 50 mm, preferably at most equal to 35 mm. Above 50 mm, the circumferential pitch spacing becomes too high and the low number of transverse cuts reduces, in particular, the grip on snowy ground.

BRIEF DESCRIPTION OF THE DRAWINGS

The features of the invention are illustrated by the schematic FIGS. 1 and 2, which are not drawn to scale.

DETAILED DESCRIPTION OF THE DRAWINGS

Figure 1:
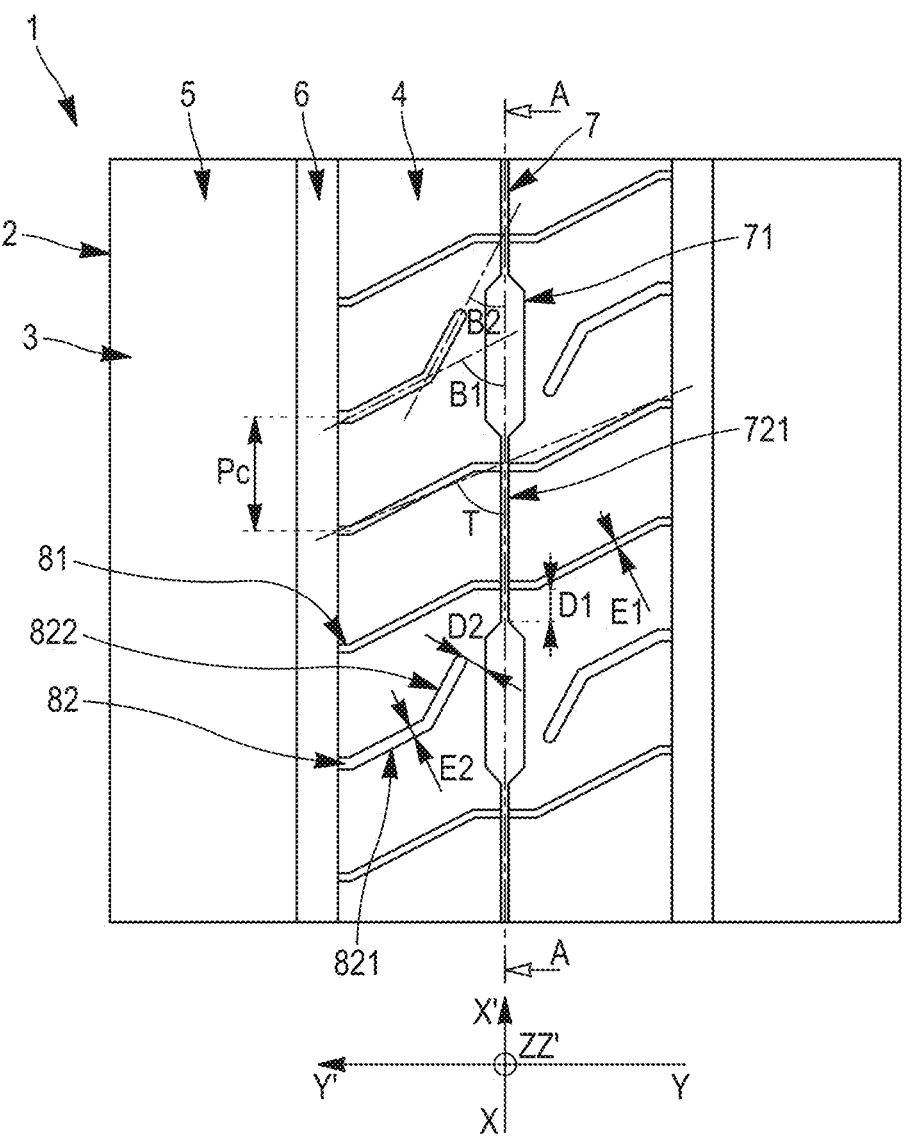
FIG. 1: View from above of a portion of a tread of a tire according to the invention.
Figure 2:
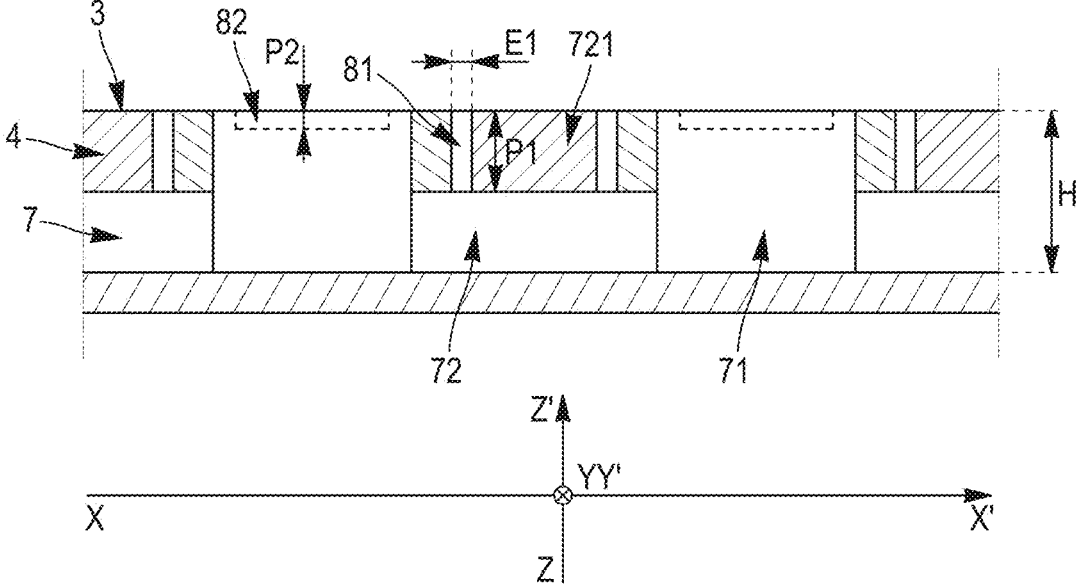
FIG. 2: Circumferential median cross section of a portion of the tread of a tire according to the invention.

FIG. 1 is a view, from above, of a portion of a tread 2 of a tire 1 according to the invention, more specifically a tire of size 245/70R17.5. The tire 1 intended to be fitted to a heavy-duty vehicle, and more particularly to a trailer of a heavy-duty vehicle, comprises a tread 2, intended to come into contact with the ground via a tread surface 3, comprising a median portion 4 and two lateral portions 5. The median portion 4 is separated from each lateral portion 5 by a circumferential cut 6 forming, with a circumferential direction XX' of the tire, a mean angle equal, in the embodiment depicted, to 0°. The median portion 4 comprises a single complex circumferential cut 7, forming, with the circumferential direction XX' of the tire, a mean angle equal to 0°. The complex circumferential cut 7 comprises, when the tire is new, an alternation of external cavities 71, opening onto the tread surface 3, and of internal cavities 72, that are hidden inside the tread 2 (and not visible in FIG. 1) and connected to the tread surface 3 by a circumferential sipe 721, two consecutive cavities, respectively an external cavity 71 and an internal cavity 72 being connected to one another. The median portion 4 comprises a plurality of transverse cuts (81, 82) having at least one portion forming, with the circumferential direction XX' of the tire, a mean angle equal to 60°. The tread 2 has a maximum depth-of-cut H (not visible in FIG. 1) equal to 13 mm. According to the invention, the plurality of transverse cuts (81, 82) comprises a first family of transverse cuts, referred to as transverse through-sipes 81, intersecting the complex circumferential cut 7 between two consecutive external cavities 71 and each having a thickness E1 equal to 0.6 mm and a depth P1 equal to 4 mm, representing 31% of the maximum depth-of-cut H. Each transverse through-sipe 81 is at a distance D1, from the nearest external cavity 71 of said complex circumferential cut 7, equal to 10 mm. The plurality of transverse cuts (81, 82) also comprises a second family of transverse cuts, referred to as blind transverse cuts 82, stopping near an external cavity 71 of the complex circumferential cut 7 and each having a thickness E2 equal to 2 mm and a depth P2 equal to 2 mm, representing 16% of the maximum depth-of-cut H. Each blind transverse cut 82 is at a distance D2, from said external cavity 71, equal to 3 mm. Each blind transverse cut 82 comprises a first transverse portion 821, forming, with the circumferential direction XX' of the tire, a mean angle B1 equal to 60°, and a blind end portion 822 forming, with the circumferential direction XX' of the tire, a mean angle B2 equal to 25°. The circumferential pitch spacing Pc between two consecutive transverse cuts of the plurality of transverse cuts (81, 82), respectively between a transverse through-sipe 81 and a blind transverse cut 82, is equal to 35 mm.

embodiment depicted, the complex circumferential cut 7 extends radially from the tread surface 3 over a depth H corresponding to the maximum depth-of-cut. In FIG. 2 two blind transverse cuts 82 of depth P2 are depicted in dotted line (because they do not open onto the plane XZ). Transverse through-sipes 81, of thickness E1 and depth P1 are also depicted, in cross section.

The inventors have more specifically studied this invention for a tire I of size 245/70R17.5 intended to be fitted to the axles of a trailer of a heavy-duty vehicle with a maximum load capacity equal to 2725 kg for an inflation pressure equal to 9 bar.

Table 1 below summarizes the characteristics of the tire I according to the invention, studied by the inventors:

TABLE 1

| Characteristics | Min | I | Max | Comments on the characteristics of I |
|---|---|---|---|---|
| Maximum depth-of-cut H | — | 13 mm | — | Maximum tread height |
| Mean angle T (/XX') of a transverse through-sipe 81 | 45° | 60° | 90° | Greater than 45° |
| Thickness E1 of a transverse through-sipe 81 | 0.4 mm | 0.6 mm | 0.8 mm | Comprised between 0.4 mm and 0.8 mm |
| Depth P1 of a transverse through-sipe 81 | 20% H | 4 mm | H | P1/H = 4/13 = 31% => greater than 20% H |
| Distance D1 from a transverse through-sipe 81 to the nearest external cavity 71 | 7 mm, preferably 10 mm | 10 mm | | Greater than 7 mm |
| Mean angle B1 (/XX') of the first transverse portion 821 of a blind transverse cut 82 | | 60° | | Greater than 45° |
| Mean angle B2 (/XX') of the second blind end portion 822 of a blind transverse cut 82 | | 25° | | Less than 45° and even less than 30° |
| Thickness E2 of a blind transverse cut 82 | 1 mm, preferably 2 mm | 2 mm | 5 mm, preferably 4 mm | Comprised between 2 mm and 4 mm |
| Depth P2 of a blind transverse cut 82 | 10% H | 2 mm | 20% H | P2/H = 2/13 = 16% => less than 20% H |
| Distance D2 from the blind transverse cut 82 to the nearest external cavity 71 | 3 mm | 3 mm | 10 mm | Comprised between 3 mm and 10 mm |
| Circumferential pitch spacing Pc of the transverse sipes | 10 mm, preferably 20 mm | 35 mm | 50 mm, preferably 35 mm | Comprised between 20 mm and 35 mm |

FIG. 2 is a circumferential median cross section of a portion of the tread 2 of a tire 1 according to the invention. This circumferential median cross section is taken on the plane of section A-A of FIG. 1, corresponding to the median circumferential plane XZ passing through the middle of the tread, and cuts through the complex circumferential cut 7 along the mean line thereof. The complex circumferential cut 7, situated in the median portion 4 of the tread 2, comprises, when the tire is new, an alternation of external cavities 71, opening onto the tread surface 3, and of internal cavities 72, that are hidden inside the tread 2 and connected to the tread surface 3 by a circumferential sipe 721, two consecutive cavities, respectively an external cavity 71 and an internal cavity 72 being connected to one another. In the The results of the performance tests, carried out on the aforementioned size 245/70 R 17.5 being studied, showed compliance with the expected results. In particular, the grip on snowy ground, tested in accordance with the method described in Annex 7 of Regulation UN 117 of the United Nations Economic Commission for Europe, is markedly improved compared to the reference Michelin tire 245/70 R 17.5 X MULTI T2, with a 35% improvement in traction. In addition, the wet grip performance, measured in accordance with the method described in Annex 5 of Regulation UN 117, and the performance in terms of road noise, measured in accordance with the method described in Annex 3 of Regulation UN 117, are on a par with the reference tire.

Finally, the performance in terms of resistance to chunking is in the process of being confirmed on customer running tests.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a heavy-duty vehicle comprising a tread, intended to come into contact with the ground via a tread surface, comprising a median portion and two lateral portions, the median portion being separated from each lateral portion by a circumferential cut forming, with a circumferential direction (XX') of the tire, a mean angle less than 45°, the median portion comprising at least one complex circumferential cut, forming, with the circumferential direction (XX') of the tire, a mean angle less than 45°, the at least one complex circumferential cut comprising, when the tire is new, an alternation of external cavities, opening onto the tread surface, and of internal cavities, that are hidden inside the tread and connected to the tread surface by a circumferential sipe, two consecutive cavities, respectively an external cavity and an internal cavity being connected to one another, the median portion comprising a plurality of transverse cuts, having at least one transverse portion forming, with the circumferential direction (XX') of the tire, a mean angle (T, B1) at least equal to 45°, the tread having a maximum depth-of-cut (H), wherein the plurality of transverse cuts comprises a first family of transverse cuts, referred to as transverse through-sipes, that intersect at least one complex circumferential cut between two consecutive external cavities and that each have a thickness (E1) at most equal to 0.8 mm and a depth (P1) at least equal to 20% of the maximum depth-of-cut (H), each transverse through-sipe being at a distance (D1), from the nearest external cavity of said complex circumferential cut, at least equal to 7 mm, and wherein the plurality of transverse cuts comprises a second family of transverse cuts, referred to as blind transverse cuts, that each have a thickness (E2) at least equal to 1 mm and a depth (P2) at most equal to 20% of the maximum depth-of-cut (H), each blind transverse cut stopping at a distance (D2), from said external cavity, at least equal to 3 mm.

2. The tire according to claim 1, wherein each transverse through-sipe has a thickness (E1) at least equal to 0.4 mm.

3. The tire according to claim 1, wherein each transverse through-sipe has a depth (P1) at most equal to the maximum depth-of-cut (H).

4. The tire according to claim 1, wherein the distance (D1) between each transverse through-sipe and the nearest external cavity is at least equal to 10 mm.

5. The tire according to claim 1, wherein each blind transverse cut has a thickness (E2) at least equal to 2 mm.

6. The tire according to claim 1, wherein each blind transverse cut has a thickness (E2) at most equal to 5 mm.

7. The tire according to claim 1, wherein each blind transverse cut has a depth (P2) at least equal to 10% of the maximum depth-of-cut (H).

8. The tire according to any claim 1, wherein at least one blind transverse cut comprises a first transverse portion, forming, with the circumferential direction (XX') of the tire, a mean angle (B1) at least equal to 45°, and a blind end portion (822) forming, with the circumferential direction (XX') of the tire, a mean angle (B2) less than 45°.

9. The tire according to claim 1, wherein the circumferential pitch spacing (Pc) between two consecutive transverse cuts of the plurality of transverse cuts is at least equal to 10 mm.

10. The tire according to claim 9, wherein the circumferential pitch spacing (Pc) between two consecutive transverse cuts of the plurality of transverse cuts is at least equal to 20 mm.

11. The tire according to claim 1, wherein the circumferential pitch spacing (Pc) between two consecutive transverse cuts of the plurality of transverse cuts is at most equal to 50 mm.

* * * * *